United States Patent
Claudel et al.

(10) Patent No.: US 9,692,828 B2
(45) Date of Patent: Jun. 27, 2017

(54) MONITORING SYSTEM FOR AN AVIONICS PLATFORM WITH THREE-TIER ARCHITECTURE

(71) Applicant: AIRBUS OPERATIONS (S.A.S.), Toulouse (FR)

(72) Inventors: Emilie Claudel, Tournefeuille (FR); Juan Lopez, Grenade (FR); Jean-Bernard Itier, Toulouse (FR); Laure Carbonne, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 511 days.

(21) Appl. No.: 14/298,515

(22) Filed: Jun. 6, 2014

(65) Prior Publication Data

US 2014/0372471 A1   Dec. 18, 2014

(30) Foreign Application Priority Data

Jun. 14, 2013   (FR) ...................................... 13 55576

(51) Int. Cl.
| | |
|---|---|
| *H04L 29/08* | (2006.01) |
| *H04L 12/24* | (2006.01) |
| *G06F 17/30* | (2006.01) |
| *B60W 50/04* | (2006.01) |

(52) U.S. Cl.
CPC ............ *H04L 67/12* (2013.01); *B60W 50/04* (2013.01); *G06F 17/30424* (2013.01); *H04L 41/0853* (2013.01); *H04L 41/0213* (2013.01)

(58) Field of Classification Search
None
See application file for complete search history.

(56) References Cited

U.S. PATENT DOCUMENTS

| | | |
|---|---|---|
| 7,006,032 B2 | 2/2006 | King et al. |
| 7,352,744 B2 | 4/2008 | Etienne et al. |

(Continued)

FOREIGN PATENT DOCUMENTS

| | | |
|---|---|---|
| EP | 2 306 672 | 4/2011 |
| FR | 2832011 | 5/2003 |

(Continued)

OTHER PUBLICATIONS

Non-Final Office Action for U.S. Appl. No. 14/485,105 dated Jul. 17, 2015.

(Continued)

*Primary Examiner* — Russell Frejd
(74) *Attorney, Agent, or Firm* — Jenkins, Wilson, Taylor & Hunt, P.A.

(57) ABSTRACT

The invention relates to a monitoring system for an aircraft platform implementing a set of avionics functions using a plurality of heterogeneous hardware and software components, including: an acquisition module for operating parameters of the components, configured to implement a plurality of communication protocols adapted to query each the component; a storage module including a database, configured to collect and store operating parameters acquired by the acquisition module in the database, and; an interface module with a plurality of clients, including a query unit configured to query the database of the storage module and supply one or several of the parameters stored in the database in response to a request made by a client; the acquisition, storage and interface modules being arranged in a three-tier architecture.

11 Claims, 1 Drawing Sheet

(56) References Cited

U.S. PATENT DOCUMENTS

| | | | |
|---|---|---|---|
| 8,341,298 B2* | 12/2012 | Wilber | H04L 67/12 |
| | | | 370/241 |
| 8,386,660 B2 | 2/2013 | Minot | |
| 9,077,641 B2 | 7/2015 | Reich et al. | |
| 9,092,611 B1* | 7/2015 | Heinrich | G06F 21/44 |
| 9,619,252 B2 | 4/2017 | Lopez et al. | |
| 2007/0183435 A1 | 8/2007 | Kettering et al. | |
| 2010/0076604 A1* | 3/2010 | Johnson | G05B 19/042 |
| | | | 700/275 |
| 2011/0066763 A1* | 3/2011 | Minot | G06F 9/44505 |
| | | | 710/12 |
| 2012/0290692 A1 | 11/2012 | Reich et al. | |
| 2015/0100774 A1 | 4/2015 | Lopez et al. | |

FOREIGN PATENT DOCUMENTS

| | | |
|---|---|---|
| WO | WO 2007/085832 | 8/2007 |
| WO | WO 2008/054507 | 5/2008 |
| WO | WO 2012/010863 | 1/2012 |

OTHER PUBLICATIONS

Interview Summary for U.S. Appl. No. 14/485,105 dated Oct. 8, 2015.
Final Office Action for U.S. Appl. No. 14/485,105 dated Jan. 8, 2016.
Advisory Action for U.S. Appl. No. 14/485,105 dated Apr. 15, 2016.
Non-Final Office Action for U.S. Appl. No. 14/485,105 dated Jun. 6, 2016.
Interview Summary for U.S. Appl. No. 14/485,105 dated Sep. 13, 2016.
"AFDX Protocol Tutorial," 2005, Version 3.0, Condor Engineering, Inc., Santa Barbara, USA. Available at URL http://sierrasales.com/pdfs/AFDXTutorial.pdf.
French Preliminary Search Report for Application No. 1358810 dated Mar. 5, 2014.
French Preliminary Search Report for Application No. FR 1355576 dated Feb. 10, 2014.
Notice of Allowance for U.S. Appl. No. 14/485,105 dated Dec. 7, 2016, 13 pages.

* cited by examiner

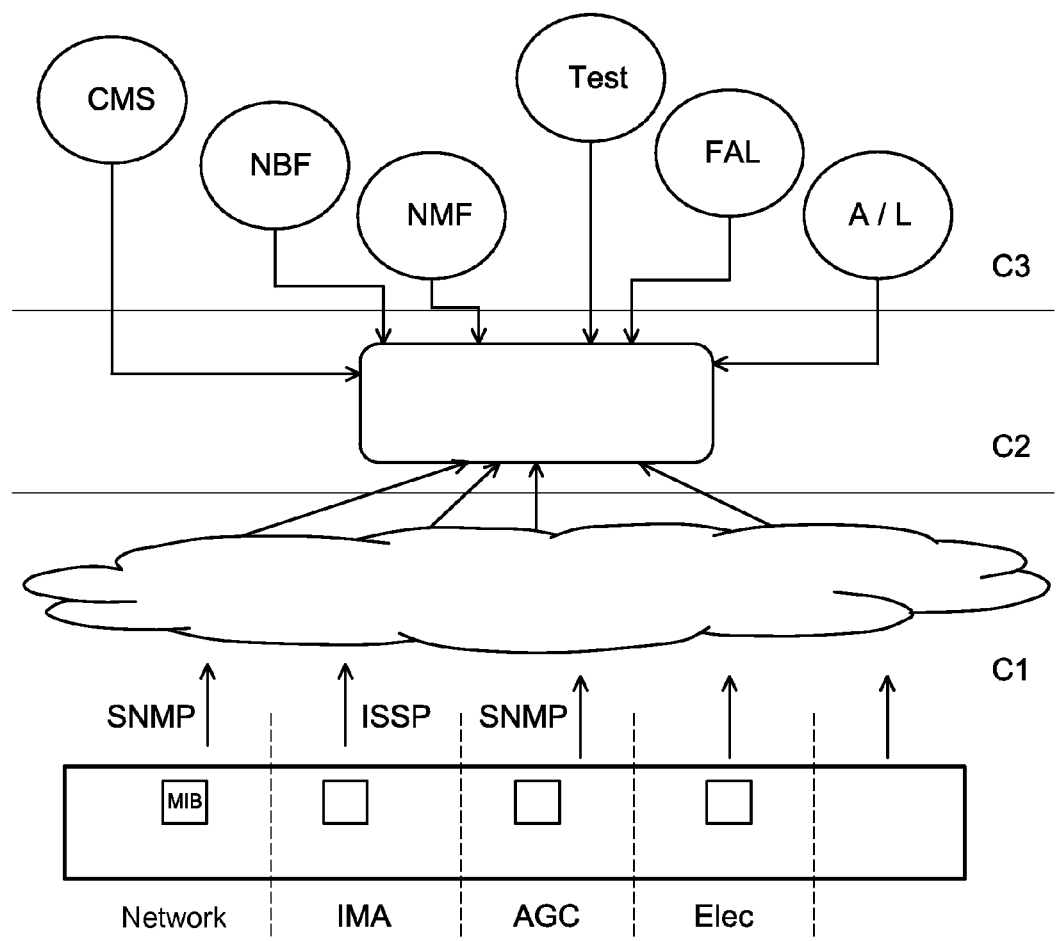

MONITORING SYSTEM FOR AN AVIONICS PLATFORM WITH THREE-TIER ARCHITECTURE

TECHNICAL FIELD

The present disclosure relates to monitoring and controlling of hardware and software components that can be used to implement a set of avionics functions on an avionics platform of an aircraft. These components include various items including software, calculators, buses, sensors, actuators, etc. They perform a wide variety of aircraft functions such as management of braking, automatic pilot, conditioned air, electricity generation, hydraulic and fuel circuits, control and configuration of systems under test, etc.

In this framework, the invention is more specifically applicable to a system that enables a set of client applications to uniformly monitor and control hardware and software components of an avionics platform, despite the technological heterogeneity of these components.

BACKGROUND

In general, monitoring is based on the following three functions: acquisition of information, processing and storage of information, display of information (in other words the man-machine interface that an operator uses to take action on this monitoring).

Currently used monitoring techniques are essentially dependent on the technologies used and the scope of their use. For example, this scope includes the AFDX type avionics network, modular avionics and the open world.

The monitoring solution for maintenance of the AFDX (Avionics Full DupleX) network makes use of an acquisition function based on standard SNMP (Simple Network Management Protocol) and MIB (Management Information Base) technologies and on a processing function intended to process, store and display information to operators. The same is true for the open world network. For modular avionics, a specific aircraft BITE (Build In Test) protocol is used for acquisition of information and its processing by a dedicated function.

Therefore three independent types of monitoring are actually implemented. Depending on needs, these monitoring systems can send information to a central computer required to correlate monitoring in order to give a global view for maintenance.

Currently used client monitoring applications have the disadvantage that they are developed independently and heterogeneously. Operation of these applications is dependent on the platform, therefore clients must define their monitoring layer as a function of the capacities of this platform. Furthermore, any modification of the platform and of the monitoring means (internal memories, protocols used, etc.) have an impact on the client application. Therefore the "acquisition, processing and storage, display" triptic mentioned above must be done independently and heterogeneously for each type of client application. This requires several developments in parallel of end-to-end monitoring tools for every application need.

Similarly, control of avionics systems under test is currently performed with heterogeneous and independently developed client applications. Operation of these applications is indeed dependent upon the systems under test and upon the various software and hardware components that are used to configure and control these systems under test.

Therefore, there is a need by which client applications can monitor, configure and control aircraft functions from end-to-end without being affected by the technological heterogeneity of the platform and thus overcoming the disadvantages mentioned above.

SUMMARY

The invention is aimed at satisfying this need and discloses a monitoring system for an aircraft platform implementing a set of avionics functions by a plurality of heterogeneous hardware and software components, comprising:
  an acquisition module for operating parameters of the components, configured to implement a plurality of communication protocols adapted to query each component;
  a storage module including a database, configured to collect and store operating parameters acquired by the acquisition module in the database;
  an interface module with a plurality of clients, including a query unit configured to query the database of the storage module and supply one or several of the parameters stored in the database in response to a request made by a client;
  the acquisition, storage and interface modules being arranged in a three-tier architecture.

Some preferred non-limitative aspects of this system are as follows:
  the interface module also comprises a client profile management unit in which the operating parameter(s) required by each client is (are) defined with an associated display format, the query unit being configured so that at the request of a client, it will query the database of the storage module and supply the client with the parameter(s) required in the associated display format as defined in the client profile management unit;
  the acquisition module is configured to acquire and transmit an operating parameter required by the storage module or required by the interface module to the storage module;
  the acquisition module is configured to periodically acquire and transmit operating parameters of the components to the storage module;
  the interface module comprises a client configured to save all or some of the acquired operating parameters;
  the acquisition module is configured to use the SNMP and ISSP protocols;
  the hardware and software components include avionics equipment components and/or ground-onboard communication equipment components and/or open world equipment components.

The invention is also applicable to a process for monitoring an aircraft platform used by a monitoring system according to the first aspect of the invention, including steps to:
  acquire operating parameters of the components using the acquisition module;
  collect and store the operating parameters acquired by the parameter acquisition module in the storage module database;
  at the request of a client, the interface module query unit queries the storage module database and one or several of the parameters stored in the database are supplied in response to the client.

The invention is also applicable to a computer program product comprising code instructions for the execution of steps in the monitoring according to the invention when the program is run on a computer.

BRIEF DESCRIPTION OF THE DRAWING

Other purposes, aspects, advantages and characteristics of the invention will become clear after reading the following detailed description of preferred embodiments of the invention, given as a non-limitative example and with reference to the single appended FIG. 1 that is a diagram showing a three-tier monitoring system according to one possible embodiment of the invention.

DETAILED DESCRIPTION

The invention discloses a system for monitoring an aircraft platform that implements a set of avionics functions by a plurality of heterogeneous hardware and software components. The system is innovative at least in that it has a modular multi-tier architecture to monitor the behaviour of aircraft functions from end-to-end, with the possibility of federating several queries through central monitoring.

As will become clear in the remainder of the description, the monitoring system comprises:
  Multi-user system: several instances may be active in parallel;
  Multi-profile system: due to its modular architecture, several businesses and types of clients can use the system without impacting the low level tiers;
  Non-intrusive implementation: the addition of clients does not require any modifications to the low level tiers of the system and does not affect existing applications; and
  Upgradeable system applicable to a multi-program approach, client applications not having to define their monitoring tier.

For illustrative purposes and with reference to FIG. 1, the heterogeneous hardware and software components to be monitored are:
  avionics equipment components such as the communication network identified by the "Network" reference in FIG. 1, the Integrated Modular Avionics (IMA), sensors and actuators,
  open world equipment (such as servers or safety modules),
  AGC (Air Ground Communication) communication equipment such as routers,
  electrical equipment (such as the harness) identified by reference "Elec" in FIG. 1,
  etc.

Also as illustrative examples and also with reference to FIG. 1, client monitoring applications of the monitoring system according to the invention may be avionics applications such as the CMS (Centralized Maintenance System), the Network Monitoring Function used for NMF tests, the BITE network function used with the NBF (Network BITE Function), or client applications on mobile devices representing the different businesses, systems or specialties for specific monitoring profiles (for example the aircraft FAL (Final Assembly Line), flight or ground "Tests", airlines (A/L).

More precisely, the system according to the invention discloses an architecture with three independent tiers (3-tier architecture) comprising a low level data access tier C1 (lower tier), an intermediate data processing tier C2 (intermediate tier) and a high level data display tier C3 (upper tier). Functions of each of these tiers are performed by a corresponding module.

The system according to the invention thus comprises a module performing the functions of the data access tier with operating parameter acquisition of heterogeneous hardware and software components on the avionics platform. In particular, this module is configured to implement a plurality of communication protocols adapted to querying each of the components.

This low level data access tier corresponds to low level querying of hardware and software components to be monitored. It is dependent on these components and therefore it may be different depending on aircraft functions in the scope of monitoring. Parameters acquired by this low level tier are defined as a function of each aircraft function to be monitored so that they can be adapted to the operating mode of monitored components. Different low level communication protocols with components to be monitored are typically implemented in this tier, for example a SNMP (<<Simple Network Management Protocol>>), ICMP (Internet Control Message Protocol), ISSP (Instrumentation Service System Partition), BITE (Build In TEst) or proprietary protocols.

The parameters to be monitored for each aircraft function may include information from the information base for management of the MIB (Management Information Base) network for the network, parameters in memory or parameters in registers that provide information about the operating mode of a hardware or software component (for example initialisation, normal mode, default mode).

The different physical interfaces necessary to dialog with the different components to be monitored (for example CAN, ARINC429, Ethernet/AFDX), can be managed using existing gateways or using a special box (LRU (Line Replaceable Unit)) including the different physical interfaces.

The system also comprises a storage module performing the functions of the intermediate data processing tier including a database. This module is configured in particular to collect and store all operating parameters acquired by the parameter acquisition module in the database.

This intermediate tier uses central adaptive monitoring that receives and memorises all (or some) of the parameters collected by the low level tier.

The database of this central monitoring tier may be updated periodically by monitored hardware and software components, the low level tier module periodically acquiring operating parameters of the components and transmitting them to the intermediate tier. The database can also be updated as a function of queries sent either by one or several clients, or by internal logic, the low level tier module acquiring and transmitting the parameters required by the intermediate tier or by the high level tier to the intermediate tier. Monitored components may thus be queried statically or dynamically using the internal logic defined in this intermediate tier.

In one embodiment, the storage module performing the functions of the intermediate tier can be configured to perform processing of acquired parameters for monitored components, for example by performing automatic correlations of these parameters in order to optimize the relevance of acquired information.

In another embodiment, the monitoring system according to the invention is also configured to perform a global aircraft maintenance function. To achieve this, the low level tier is configured to retrieve information through the BITE protocol, while the intermediate tier is configured to perform the task usually done by the central maintenance system CMS to perform the diagnostic.

The system comprises a third module performing the functions of the high level data display tier, and interface with a plurality of clients. This module comprises a query unit configured to query the database of the storage module at the request of a client, and provide the client with one or several operating parameters stored in the storage module database. This module may also include a client profile management unit in which the operating parameter(s) required by each client and an associated display format are defined, the query unit being configured so that it queries the storage module database at the request of a client and provides the client with the required parameter(s) in the associated display format as defined in the client profile management unit.

This high level tier corresponds to management of client requests, in other words queries to the intermediate central monitoring tier so as to provide the required parameter in a format chosen by the client. A client may query the central monitoring tier or it may perform an interactive query request of monitored hardware and software components.

A client may be an onboard or other avionics function (maintenance, network monitoring or network diagnostic), or it may be a user who wishes to monitor an aircraft function during the aircraft development, assembly or operation phase. Therefore, these clients may be on the ground or onboard the aircraft.

Each client has a specific profile and comprises a man-machine interface MMI that is defined and adapted as a function of monitored aircraft functions and the subsequent use of acquired parameters.

In breaking down monitoring of aircraft functions into independent tiers, the invention can federate heterogeneous queries on a single platform. Monitoring operates on a client/server mode from a central monitoring tier. The different client monitoring applications can query the same database simultaneously and acquire chosen parameters independently of the format of these parameters. And these client monitoring applications are independent of any hardware or protocol modification of the platform to be monitored.

The breakdown into independent tiers disclosed by the invention also helps to modify a tier independently without affecting the other tiers. Thus, the addition of a hardware or software component to be monitored may make it necessary to modify the low level tier to define parameters to be monitored and possibly the communication protocol with this component, but does not necessarily require that the other tiers have to be modified. Only the client concerned by this new component modifies its interface. Similarly, the addition of a client requires a modification to the high level tier to define parameters to be acquired and the display format of these parameters (in other words the client profile), but does not require a modification of the other two tiers if these parameters have already been defined and used by another client.

In one embodiment, a monitoring system according to the invention periodically records all parameters or a predefined set of parameters, by event or on request. This is done by implementing a "recorder" client in the high level tier. Alternately, a storage space may be reserved in the intermediate tier configured by internal logic to record in the storage space.

It has previously been mentioned that clients may be avionics applications or devices external to the aircraft. In the case of devices external to the aircraft, the intermediate central monitoring tier may be either onboard the aircraft or hosted on the ground.

Furthermore, monitoring of aircraft functions and associated hardware and software components according to the invention may be done on the ground to enable verifications during the development phase, the final assembly phase or for example during a maintenance operation. The client may be an operator or an avionics function. This monitoring may be done in flight, in which case the client may be an operator (pilot) or an avionics function.

A first example application of the invention applies to monitoring of the AFDX network and components of the integrated modular architecture IMA. The system according to the invention can monitor at least the following during the aircraft development phase:
  network communication and associated switches,
  operation of CPIOM calculators (Core Processing Input/ Output Module) and software integrated into these calculators.

Initially, the intermediate central monitoring tier may be generated if necessary, either manually or automatically from inputs such as the network configuration, definition of platforms and monitoring parameters.

Once this first step has been completed, the network is monitored by querying the MIB switch databases through the SNMP protocol. CPIOM calculators are monitored by querying their MIB information bases through the SNMP protocol to obtain the status in terms of AFDX communication and by querying software applications integrated into these calculators using the ISSP protocol to obtain the status in terms of the operating mode of each software application (CPU load, operation in normal or default mode, etc.).

From an application point of view, although the queried components are heterogeneous, the client displays all monitored components directly using the same graphic interface and can query them interactively.

Two distinct clients can also query the same components simultaneously from two different items of equipment by connecting to the intermediate central monitoring tier. These two clients may use the same parameters or different parameters if their needs are different.

A second example application of the invention relates to monitoring of integrated modular architecture IMA components and onboard/ground communication components.

Firstly, the central monitoring tier may be generated either manually or automatically if necessary starting from the aircraft definition.

Once this first step has been done, the invention allows monitoring the following in the aircraft operational phase:
  operation of CPIOM calculators and software integrated on these calculators;
  on board/ground communication and communication between routers and associated servers.

For example, a first operator monitors CPIOM calculators from a PC. The system according to the invention queries the calculators using the SNMP and ISSP protocols and then displays the information requested by this operator using a first adapted graphic interface.

A second operator simultaneously monitors onboard/ ground communication components from a digital tablet. The system according to the invention queries routers and servers using the SNMP protocol and then displays the information requested by this operator using another appropriate graphic interface.

It should be noted that the monitoring system according to the invention may also be used to take account of structural monitoring problems, the low level acquisition tier retrieving digital information from sensors placed on the structure, either by a conventional wire approach or by an RFID type wireless approach or other. The monitoring system may also be used as a test tool, either for the development of flight tests or for production to integrate the different existing tools (wiring continuity test, correct operation of discretes, etc.) or as an aircraft configuration management tool, by querying part numbers.

In an embodiment, the three-tier system of the invention is also used to control heterogeneous hardware and software components of an aircraft platform, such as those used in a test bench to configure and control systems under test, using a centralized and standardized interface independent of the heterogeneous components.

While the description above dealt with acquiring data (operating parameters) from heterogeneous hardware and software components by a centralized tier independent of these components, in this embodiment the centralized tier is used to provide data (control parameters) to the heterogeneous hardware and software components. Upon receiving control parameters, the components may implement configuration or control of systems under test.

To this purpose, the system comprises the following modules and unit arranged according to the three-tier architecture of the invention:
  in the lower tier, a control module of the heterogeneous components, configured to implement a plurality of communication protocols adapted to send control parameters to the heterogeneous components;
  in the intermediate tier, a processing module configured to process control parameters and to send the processed control parameters to the control module in the lower tier;
  in the upper tier, the interface module with a plurality of clients further comprises a control unit configured, in response to a request made by a client, to send control parameters to the processing module in the intermediate tier.

An example application of this embodiment applies to downloading software on an aircraft calculator (system under test) and checking that this downloading has been properly made before configuring the system under test and performing a test. To this end, control of a download component must be performed, then acquisition of the reference of the software installed in the calculator once the download is complete.

Several download components can be used, such as developing tool EDAT (Eurogiciel Dataloading Tool), developing tool OMSTOOL or the official tool DLCS (Data Loading and Configuration System).

The control unit in the interface module can be used by a client to define the scenario "download and reference check" which is identical whatever the download component that is to be actually used. The processing module in the intermediate tier processes and formats this scenario into downloading control parameters which are identical whatever the download component that is to be actually used. Then the control module in the lower tier adapts the downloading control parameters to the download component actually used. And the software reference may afterwards be acquired using the three tier architecture described above by interrogating by the lower tier an acquisition component configured to query the calculator and by reporting by the upper layer the acquired information to the client.

It will be appreciated that the selection of the configuration and control operations to be performed by the heterogeneous components may be performed manually or automatically through predefined scenarios.

The subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for an aircraft platform implementing a set of avionics functions using a plurality of heterogeneous hardware and software components, the system comprising:
  an acquisition module for acquiring operating parameters of the components, configured to implement a plurality of communication protocols each configured to query a respective component of the heterogeneous hardware and software components;
  a storage module including a database, configured to collect and store the operating parameters acquired by the acquisition module in the database in response to a request made by a client;
  an interface module for interfacing with a plurality of clients, including a query unit configured to query the database of the storage module and supply several of the operating parameters acquired by the acquisition module from several different components using several different communications protocols, causing a client monitoring application for the client to display the several operating parameters using a same graphic interface in a format selected by the client monitoring application;
  and wherein the acquisition, storage and interface modules are arranged in a three-tier architecture comprising a lower tier in which the acquisition module is arranged, an intermediate tier in which the storage module is arranged and an upper tier in which the interface module is arranged.

2. The system according to claim 1, in which the interface module also includes a client profile management unit in which the operating parameter(s) required by each client and an associated display format are defined, the query unit being configured so that it will query the storage module database at the request of a client and provide the client with the required parameter(s) in the associated display format as defined in the client profile management unit.

3. The system according to claim 1, in which the acquisition module is configured to acquire and transmit an operating parameter required by the storage module or by the interface module to the storage module.

4. The system according to claim 1, in which the acquisition module is configured to periodically acquire and transmit operating parameters of the components to the storage module.

5. The system according to claim 1, in which the interface module comprises a client configured to save all or some of the acquired operating parameters.

6. The system according to claim 1, in which the acquisition module is configured to use the SNMP and ISSP protocols.

7. The system according to claim 1, further comprising:
in the lower tier, a control module of the components, configured to implement a plurality of communication protocols configured to send control parameters to the components;
in the intermediate tier, a processing module configured to process control parameters and to send the processed control parameters to the control module in the lower tier;
and wherein in the upper tier, the interface module with a plurality of clients further comprises a control unit configured, in response to a request made by a client, to send control parameters to the processing module in the intermediate tier.

8. The system according to claim 7, wherein the components are configured to implement configuration or control of systems under test.

9. The system according to claim 1, in which the hardware and software components include avionics equipment components and/or ground-onboard communication equipment components and/or open world equipment components.

10. A process for monitoring an aircraft platform using the system according to claim 1, comprising:
acquire operating parameters of the components using the acquisition module;
collect and store the operating parameters acquired by the acquisition module in the storage module database;
at the request of a client, the interface module query unit queries the storage module database and one or several of the parameters stored in the database are supplied in response to the client.

11. A computer program product comprising code instructions for execution of steps in the process according to claim 10 when the program is run on a computer.

* * * * *